E. E. WICKERSHAM.
DOUBLE GEAR TRANSMISSION MECHANISM.
APPLICATION FILED AUG. 16, 1915.

1,344,366.

Patented June 22, 1920.
2 SHEETS—SHEET 1.

WITNESSES:
Charles Pickles
Thos Castberg

INVENTOR
Elmer E. Wickersham
BY Strong Townsend
ATTORNEYS

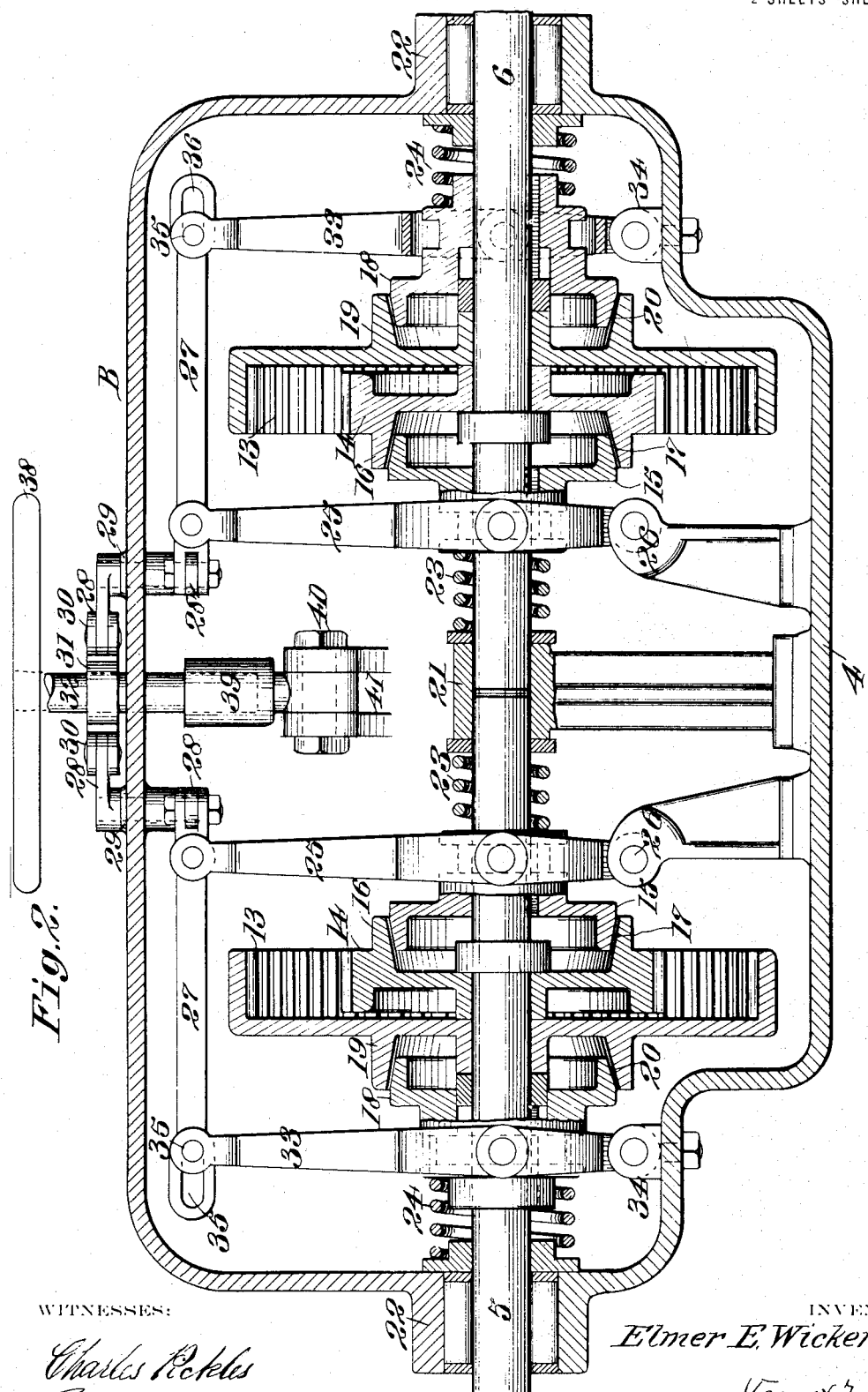

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

DOUBLE-GEAR TRANSMISSION MECHANISM.

1,344,366.   Specification of Letters Patent.   Patented June 22, 1920.

Application filed August 16, 1915. Serial No. 45,640.

*To all whom it may concern:*

Be it known that I, ELMER E. WICKERSHAM, a citizen of the United States, residing at Stockton, in the county of San Joaquin and State of California, have invented new and useful Improvements in Double-Gear Transmission Mechanism, of which the following is a specification.

This invention relates to a double gear transmission mechanism.

The object of the present invention is to provide a simple, substantial, compact, heavy-duty transmission mechanism, particularly adapted for use on traction engines of the self-laying track type, and which is so constructed that power may be transmitted from the engine shaft to a pair of driving shafts in such a manner that both shafts may drive forward, reverse or run free in unison, or drive forward, reverse or run free independently of each other. Further objects and advantages will appear hereinafter.

The invention consists of the parts and the combination and construction of parts as hereinafter more fully described and claimed, having reference to the accompanying drawings, in which—

Fig. 2 is a cross section on line 2—2, Fig. 1.

Figure 1:
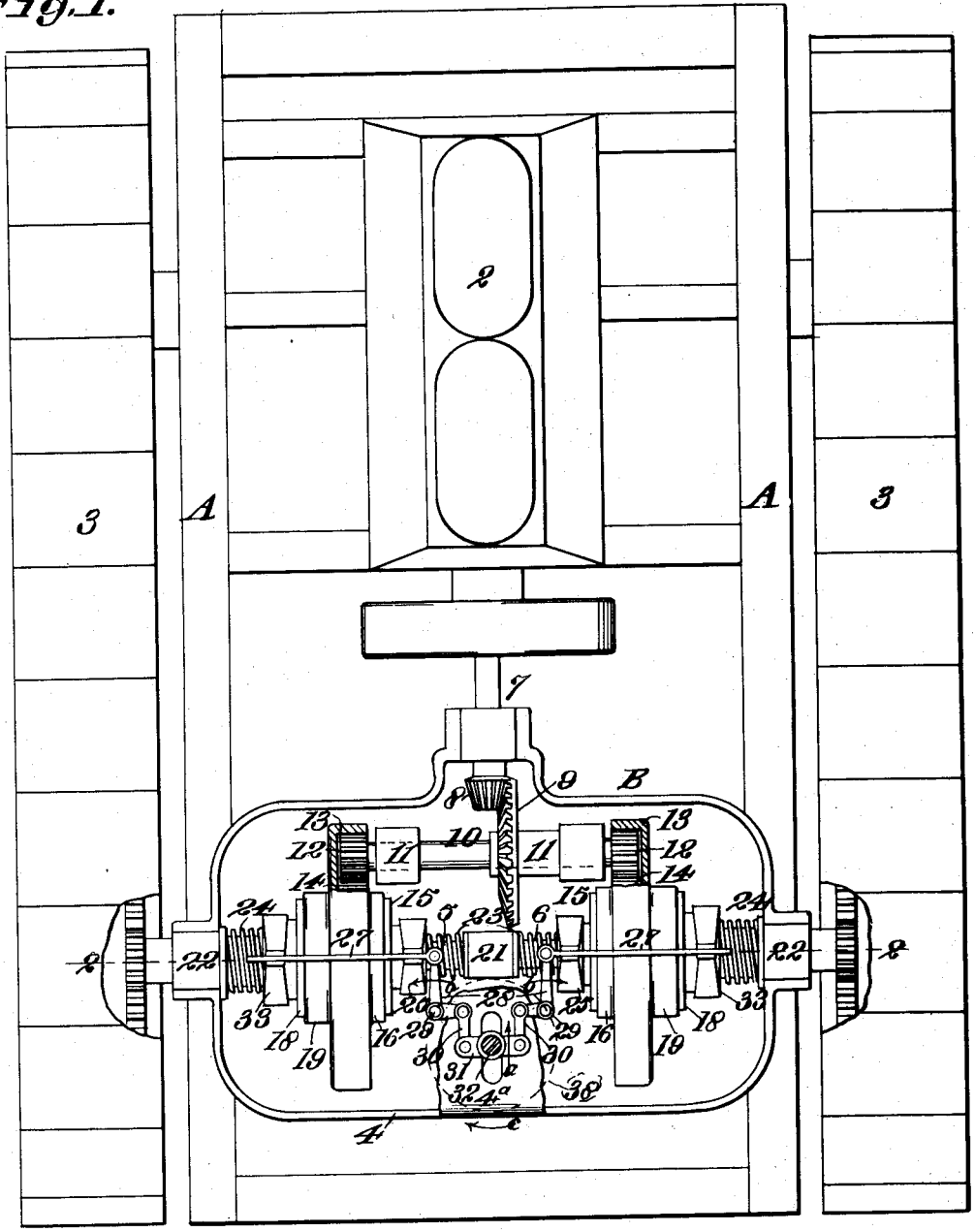
Figure 1 is a plan view partly in section, of a traction engine of the self-laying track type, showing the application of the invention.

Referring to the drawings in detail, A indicates the main frame of a tractor; 2 the engine; 3 the self-laying track chain, of which there is one on each side of the frame; and B indicates in general, the transmission mechanism through which power is transmitted from the engine shaft to the self-laying tracks.

The transmission mechanism as a whole comprises a casing 4, interior of which is journaled a pair of driving shafts 5—6, to which power is transmitted to each shaft from the engine shaft, indicated at 7, through a bevel gear pinion 8, which intermeshes with a bevel gear 9 secured upon a counter-shaft 10 mounted in journal boxes 11 formed interior of the main transmission case 4. Secured on each end of the counter-shaft 11 is a spur gear 12, each of which are constantly in mesh with a pair of gears 13—14, which are loosely mounted on the adjacent driving shafts 5—6; gear 13 being an internal gear and gear 14 an external gear. Mounted on the inner side of each gear 14 is a cone clutch 15, each of which is keyed and slidably mounted on their respective driving shafts, and formed on the adjacent faces of gears 14 are projecting annular flanges 16 on the inner faces of which are formed coöperating clutch faces 17. Similarly mounted exterior of gears 13 are cone clutches 18, each keyed and slidably mounted on their respective driving shaft, and formed on the exterior side of gears 13 are annular flanges 19 on the inner sides of which are formed coöperating clutch faces 20.

The inner ends of the driving shafts 5—6 are supported by a central journal box 21, while the outer ends of the shafts project through and are supported in journal boxes 22 of suitable construction. Interposed between the central bearing 21 and cone clutches 15 are coil springs 23 which are adapted to normally throw clutches 15 into engagement with the coöperating members 16 formed on gears 14; and similarly interposed between the exterior journal boxes 22 and cone clutches 18 are coil springs 24 which also are adapted to normally throw the clutches into engagement with the coöperating members 19, formed on the internal gears 13.

Referring to Fig. 2 it will be seen that clutches 15 are thrown into and out of engagement with their coöperating members 16 by means of levers 25, which are pivotally mounted as at 26, near their lower ends, while the upper ends are connected with the inner ends of links 27, which in turn are connected with bell cranks 28, pivotally mounted as at 29, in the cover section 4ª of the transmission case; the bell cranks being in turn operated by means of links 30 connected with a cross-arm 31 secured on a pivotally mounted upright 32, which will hereinafter be known as the "steering post."

The exterior clutches 18 are similarly thrown into and out of engagement with their coöperating members 19, by means of levers 33, which are pivotally mounted near their lower ends at 34, while the upper ends are connected with the outer ends of links 27, as indicated at 35.

By again referring to Fig. 2 it will be seen that links 27 are slotted as at 36 at the points where levers 25 and 33 are attached, and that the length of these slots is such that the clutches will normally be held out of contact with their coöperating members formed on the several gears, as heretofore described.

The steering post indicated at 32 is provided with a hand-wheel 38 at its upper end for the purpose of rocking the steering post, and also for the purpose of turning same. This is accomplished by mounting the steering post proper in the socket member 39, which is pivotally mounted as at 40 between a pair of lugs 41 formed in the lower section of the transmission case 4.

In operation with the steering post standing in a central position shown in Fig. 1, it will be seen that both the forward and reversing clutches are standing in a position where they are out of engagement with their coöperating members, the clutches being held in this position by the space formed between the slotted ends of links 27. If it is desired to transmit a forward drive from the engine shaft 7 to the driving shafts 5—6 in unison, it is accomplished by rocking the steering post on the pivot 40 in the direction of arrow $a$. This will cause links 30 to rock the bell cranks in the direction of arrows $b$, and consequently cause links 27 to move in opposite directions. The cone clutches 18 will in this manner be moved away from their coöperating faces against the tension of springs 24, while the cone clutches 15 will be actuated to move into engagement with their coöperating faces formed on external gears 14. Power will thus be transmitted through shaft 7, gears 8—9, counter-shaft 10, spur pinions 12, gears 14 and clutches 15, direct to the drive shafts 5—6, to propel the tractor in a forward direction.

If it is desired to reverse the movement of the tractor, it is only necessary to rock the steering post in the direction opposite to arrow $a$. Clutches 15 will then be moved out of engagement while clutches 18 will be moved into engagement with their coöperating members formed on gears 13. Power is then transmitted through spur gears 12 and the internal gears 13 with connected clutches 18 direct to the driving shafts 5—6, thus reversing the movement of the tractor.

It is similarly possible to permit one driving track to turn in a forward direction and for the opposite track to run idle by turning the steering post in the direction in which it is desired to turn. For instance, if it is desired to turn to the right, it is only necessary to turn the hand-wheel in the direction of arrow $c$. This causes the cross arm 31 to move link 30 on the left-hand side in the direction of arrow $b$, causing clutch 15 to be thrown into engagement and clutch 18 out of engagement, and will at the same time pull link 30 on the right-hand side in the opposite direction causing clutch 15 to be thrown out, thus permitting the right-hand track to run free while the left-hand track is driving. The still further movement of the hand-wheel in the direction of arrow $c$ will cause clutch 15 to move still farther away from its coöperating member 16, while clutch 18 will move into engagement causing a reverse drive to be transmitted to the right-hand track while a forward drive is being transmitted to the left-hand track, thus permitting the tractor to make a very short turn, or practically turn around with the center of the tractor frame as an axis; the same cycle of operation being performed by turning the steering wheel to the left, if it is desired.

From the foregoing description it will be seen that it is possible to transmit power to both driving shafts to drive either forward, reverse or run free in unison, or to transmit power to either shaft independently of the other, either forward, or reverse or to run free.

The transmission mechanism as a whole is simple and substantial in construction and very compact as the arrangement of the spur gear driving pinions 12 is such that they are always in mesh with both gears 13 or 14. The construction and arrangement of the cone clutches is such that practically no adjustment is required as the interposed coil springs will always move the clutches into engagement and take up any wear that may take place. The arrangement in general furthermore permits a rigid and heavy construction throughout, thus making it particularly adapted for heavy-duty transmission.

Having thus described my invention what I claim and desire to secure by Letters Patent is—

1. In a transmission mechanism, a driving shaft, an internal gear turnably mounted on said shaft, a spur gear turnably mounted on the shaft, a power shaft, a driving pinion gear secured on said shaft intermediate of the internal gear and spur gear, and intermeshing with both, a pair of clutches keyed and slidably mounted on the driving shaft and adjacent each gear, and coöperating clutch members secured on each gear.

2. In a transmission mechanism, a driving shaft, an internal gear turnably mounted on said shaft, a spur gear turnably mounted on the shaft, a power shaft, a driving pinion gear secured on said shaft intermediate of the internal gear and spur gear, and intermeshing with both, and means for locking either of said gears to revolve the driving shaft.

3. In a transmission mechanism, a pair of driving shafts, an internal gear and an external gear loosely mounted on each driving shaft, a power shaft, a driving pinion gear secured one on each end of the shaft, said driving pinions intermeshing both with the internal and external gears on each driving shaft, means for locking the internal gears to reverse the driving shafts in unison, means for releasing the gears to permit the driving shafts to run idle, means for locking either internal gear independent of the other, means for locking the external gears to revolve the driving shafts forward in unison, and means for locking either external gear independent of the other.

4. In a transmission mechanism, a pair of driving shafts, an internal gear and an external gear loosely mounted on each driving shaft, a power shaft, a driving pinion gear secured one on each end of the shaft, said driving pinions intermeshing both with the internal and external gears on each driving shaft, a clutch adjacent each gear keyed and slidably mounted on each driving shaft, means for engaging or disengaging the internal gear clutches in unison or independent of each other, and means for engaging or disengaging the external gear clutches in unison or independent of each other, 5. In a transmission mechanism, a driving shaft, a pair of longitudinally alined driven shafts parallel to the driving shaft, constantly meshing gears operatively connecting all of said shafts, means effecting the operation of the gears to cause the drive shaft to rotate the driven shafts forward or reverse in unison, or forward or reverse independently of each other, and a single controlling means for producing said actions.

In testimony whereof I have hereunto set my hand in the presence of two subscribing witnesses.

ELMER E. WICKERSHAM.

Witnesses:
JOHN H. HERRING,
R. S. JINNINGER.